United States Patent
Sanchez Herrero et al.

(10) Patent No.: US 8,745,182 B2
(45) Date of Patent: Jun. 3, 2014

(54) PROVISION OF PUBLIC SERVICE IDENTITIES

(75) Inventors: Juan Antonio Sanchez Herrero, Madrid (ES); John Michael Walker, Alcobendas (ES); Maria Esther Terrero Diaz-Chiron, Madrid (ES)

(73) Assignee: Optis Wireless Technology, LLC, Plano, TX (US)

( * ) Notice: Subject to any disclaimer, the term of this patent is extended or adjusted under 35 U.S.C. 154(b) by 2107 days.

(21) Appl. No.: 11/573,500

(22) PCT Filed: Aug. 10, 2005

(86) PCT No.: PCT/SE2005/001197
§ 371 (c)(1),
(2), (4) Date: Sep. 3, 2008

(87) PCT Pub. No.: WO2006/016846
PCT Pub. Date: Feb. 16, 2006

(65) Prior Publication Data
US 2009/0227236 A1  Sep. 10, 2009

(51) Int. Cl.
*G06F 15/173* (2006.01)
(52) U.S. Cl.
USPC .......................................... 709/223
(58) Field of Classification Search
USPC .......................................... 709/223
See application file for complete search history.

(56) References Cited

U.S. PATENT DOCUMENTS

| 7,054,615 | B2 * | 5/2006 | Evensen et al. | 455/411 |
| 7,185,087 | B2 * | 2/2007 | Gourraud | 709/224 |
| 7,434,258 | B2 * | 10/2008 | Bajko et al. | 726/21 |
| 2004/0122934 | A1 * | 6/2004 | Westman et al. | 709/223 |
| 2005/0002381 | A1 * | 1/2005 | Westman et al. | 370/352 |

OTHER PUBLICATIONS

"3GPP TS 23.228 V6.5.0 Technical Specification Group Services and System Aspects; IP Multimedia Subsystem (IMS), stage 2, release 6" 3GPP TS 23.228 V6.5.0, Mar. 2004, pp. 1-174, XP002311850 cited in the application p. 26, section 4.3.6 p. 32, section 4.10 p. 62, section 5.4.11—p. 67, section 5.4.12.5 p. 100, section 5.8.4; Figure 5.21.

* cited by examiner

*Primary Examiner* — Krista Zele
*Assistant Examiner* — Esther Benoit
(74) *Attorney, Agent, or Firm* — Vincent J. Allen; Carstens & Cahoon, LLP

(57) ABSTRACT

The present invention is aimed to provide a mechanism whereby a Public Service Identity identifying a service, which runs in an application service, may be created in a network both dynamically by the application server and statically by an O & M system, the means and method for the dynamic creation harmonizing with those for the static creation, and allowing a similar behavior of the network with minimum impact when the service is invoked. Therefore, the present invention provides a new method, a new central entity in the network, and enhanced Home Subscriber Server and application server, all co-operating to carry out the different embodiments for the invention.

22 Claims, 5 Drawing Sheets

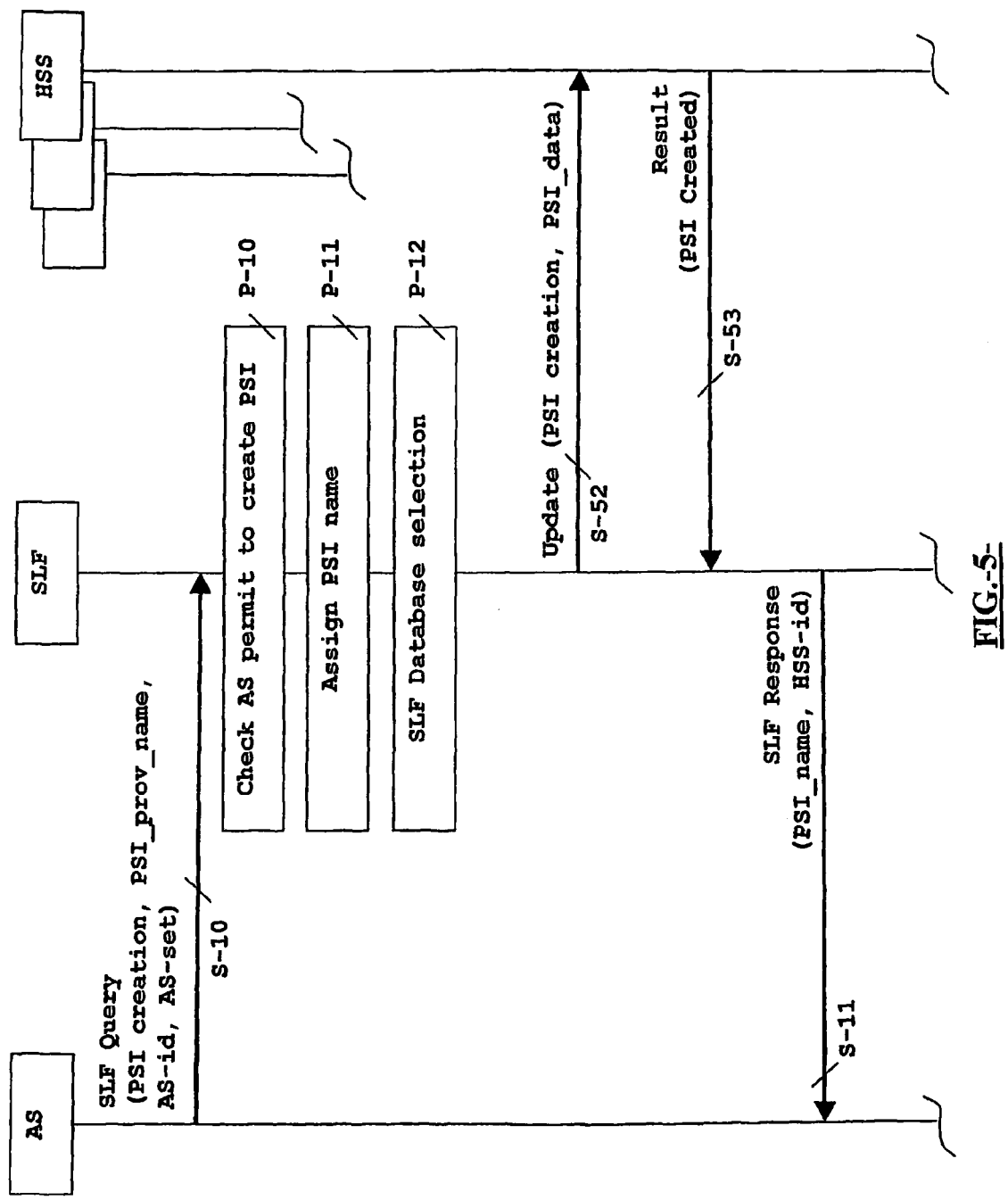
FIG.-5-

PROVISION OF PUBLIC SERVICE IDENTITIES

FIELD OF THE INVENTION

The present invention generally relates to the provision of a mechanism for creation, management and use of Public Service Identities to identify services running in specific application servers. In particular, the present invention ensures the uniqueness of each Public Service Identity against existing Public Service Identities, existing Public User Identities, and also against any existing Public Service Identity range.

BACKGROUND

At present, the 3$^{rd}$ Generation Partnership Project (generally known as '3GPP') has introduced the basis for an IP Multimedia Subsystem (generally known as 'IMS') and IMS services, as stated in the technical specification 3GPP TS 23.228 V6.6.0 (2004-06). In accordance with 3GPP, and derived from the introduction of standardised presence, messaging, conferencing, and group service capabilities in the IMS, there is a need for Public Service Identities. These Public Service Identities are different from the Public User Identities in the respect that the former identify services, which are hosted and operated by application servers (generally known as 'AS' in at least said 3GPP technical specification), whereas the latter identify users whose subscription data are hosted in subscriber databases under network operator premises, and who are served by different serving network nodes such as a Serving Call Session Control Function (known as 'S-CSCF' under 3GPP).

Generally speaking, Public Service Identities are used to identify services running on specific application servers. In particular, Public Service Identities are used to identify groups of services such as a chat-type service, for instance, that may use a Public Service Identity (hereinafter referred to as 'PSI') to which the users may establish a session in order to enable the sending and reception of messages from other session participants. Public Service Identities are presently assumed to take the form of SIP URL or SIP URI as defined by the Internet Engineering Task Forces (IETF) in RFC 3261 and RFC 2396, as well as in the so-called 'tel:'-URL format as defined in RFC 2806. An exemplary Public Service Identity (PSI) identifying a chat-type service may be sip:chatlist_X@example.com.

In accordance with the above 3GPP technical specification, and as an important issue aiming the present invention, the IMS must be provided with a mechanism for users and network operators to create, manage, and use Public Service Identities under control of specific application servers (AS). More specifically, there is a need for a mechanism to make possible the creation of Public Service Identities both statically, such as by means of an Operation and Maintenance system (hereinafter referred to as 'O&M') under control of the network operator, and dynamically by the users themselves.

As already introduced above when differentiating Public Service Identities from Public User Identities, each Public Service Identity (PSI) is hosted by an application server (AS), which executes the service specific logic as identified by the Public Service Identity. In other words, an application server runs a particular service identified by a Public Service Identity. In operation, the IMS provides the means for routing IMS messages related to particular IMS services by using corresponding Public Service Identities.

Therefore, as the above 3GPP technical specification states, Public Service Identities, which are created either statically by O&M or dynamically by the users, are stored in a Home Subscriber Server (generally known as 'HSS') holding subscription data for subscribers of a home network operator. A server acting as an HSS may thus know how to route any message involving a particular Public Service Identity (PSI) towards an appropriate application server (AS) hosting a correspondingly identified service. To this end, the HSS knows for each Public Service Identity (PSI) an identifier (AS-Id) of the application server (AS) where the corresponding service runs. In this respect and from a conceptual point of view, the identifier (AS-Id) of the application server running a service, along with the Public Service Identity (PSI) identifying the service, are stored in the HSS and have an entry in said HSS that is referred to as a 'PSI user'.

The explanations given hereinbefore imply some consequences, or rather some requirements that Public Service Identities are supposed to fulfil. On the one hand, the uniqueness of each Public Service Identity (PSI) to be created must be ensured. On the other hand, this uniqueness does not only apply in respect of other existing Public Service Identities but also in respect of the existing Public User Identities already defined under network operator premises. Bearing in mind the uniqueness of a Public Service Identity (PSI), a further and important issue also aiming the present invention is the handling of wildcard Public Service Identities.

In this respect, Public User Identities can adopt two different forms of representation and scope. A first one is a so-called 'Distinct PSI', such as sip:my_service@example.com. As stated in 3GPP technical specifications, the 'Distinct PSI' may be created, modified and deleted in the HSS by the operator via O&M mechanisms, as well as by an application server (AS) via a 3GPP-defined 'Sh' interface. Also in accordance with 3GPP, there is a need for allowing a 'Distinct PSI' to be created and deleted by users using a 3GPP-defined 'Ut' interface.

A second scope and form of representation is a so-called 'Wildcard PSI', such as sip:chatlist_*@example.com, wherein a range of Public User Identities is defined with a same domain part in the SIP URI and with a wildcard indication in the user part of the SIP URI. 'Wildcard PSI' ranges may be created, modified and deleted in the HSS by the operator via O&M mechanisms, whereas individual Public User Identities within a 'Wildcard PSI' range may be created and deleted by users using the above 3GPP-defined 'Ut' interface towards an application server (AS) hosting said 'Wildcard PSI' range. Individual Public User Identities within a 'Wildcard PSI' range may be created and deleted by the operator directly in the application server (AS) via O&M mechanisms as well.

Currently existing mechanisms do not describe how a PSI can be created, modified or deleted, by the operator or by the user, and how PSI routing can be solved in different usage scenarios. More precisely, the current technical specification does not identify some drawbacks derived from the current state of art.

A first drawback to solve, and aiming the present invention is the PSI uniqueness. So far, the standard does not propose any mechanism to ensure PSI uniqueness when a PSI is created and populated by either an end-user, by an O&M under operator premises, or by an application server itself. Moreover, the PSI uniqueness is not only to be checked against existing Public Service Identities, or against Public User Identities, but also against any 'Wildcard PSI' wherein a PSI belonging to a range might match a PSI to be created into a given domain.

Moreover, each PSI may be hosted by a specific application server (AS) and, therefore, the application server may request the use of a specific format for the PSI. The state of the art does not consider the selection of a PSI format by the application server and how the uniqueness is assured in case that several application servers make use of the same PSI format. Thereby, the use of 'Wildcard PSI' ranges through different application servers is also an issue aiming the present invention.

Further, a PSI dynamically created in an application server, either by an end-user or directly created by the application server itself, needs to be populated in an HSS as a result. Therefore, the 3GPP specification proposes the use of the 3GPP-defined 'Sh' interface. However, an application server is not traditionally arranged to arbitrarily select an HSS in which the PSI can be stored, where more than one HSS exist in the network. Moreover, and in accordance with currently existing trends, an application server (AS) is not supposed to be aware of the architecture of deployed HSS servers. Thereby, the creation, management and use of a PSI and a 'PSI user', where more than one HSS exist in the network, are relevant issues aiming the present invention.

In addition, the creation and deletion of a PSI by application servers require the consideration of security mechanisms to allow a secure handling that is not covered by current solutions. Thus, a further aim of the present invention is the provision of a secure handling of a PSI, in terms of creation, modification and deletion of said PSI, in order to preclude a misuse of network operator premises.

Therefore, an object of the present invention is the provision of a mechanism whereby a Public Service Identity (PSI) may be created by either an end-user, by an O&M under operator premises, or by an application server itself, and populated in one among a plurality of Home Subscriber Servers whilst ensuring the PSI uniqueness against existing Public Service Identities, existing Public User Identities, and also against any existing 'Wildcard PSI' range.

SUMMARY OF THE INVENTION

The above objects are accomplished in accordance with the present invention by the provision of a method and several entities, they all co-operating to provide a mechanism whereby a Public Service Identity identifying a service, which runs in an application service, may be created in a network both dynamically by the application server and statically by an O&M system. Thanks to the provisions of the invention, the means and method for the dynamic creation harmonise with those for the static creation, thus allowing a similar behaviour of the network with minimum impact when the service is invoked.

In accordance with an aspect of the present invention, there is provided a central entity for handling Public Service Identities in a network, each Public Service Identity identifying a service running in an application server, the central entity having:
  means for storing Public User Identities for users with a subscription in the network;
  means for receiving a Public Service Identity identifying a service;
  means for checking the uniqueness of the received Public Service Identity against existing Public Service Identities and Public User Identities;
  means for storing the Public Service Identity assigned to the service along with an identifier of a Home Subscriber Server assigned to hold the assigned Public Service Identity; and
  means for providing the identifier of the assigned Home Subscriber Server upon a query based on the assigned Public Service Identity.

In this central entity, the Public Service Identity may be received from an application server in charge of executing the corresponding service and, in such a case, the central entity may further include means for answering to the application server the Public Service Identity assigned to the service, along with an identifier of the assigned Home Subscriber Server.

This central entity may, in accordance with an embodiment of the invention, include means for selecting the Home Subscriber Server to be assigned from a plurality of Home Subscriber Servers known to the central entity.

In accordance with some embodiment of the invention, the central entity may be arranged so that the means for checking the uniqueness of the received Public Service Identity further comprises means for assigning a unique Public Service Identity different than the one received in case the latter matches any existing Public Service Identity or Public User Identity, or fulfils conditions of a 'Wildcard PSI' range other than an indicated one.

In this central entity, the means for answering to the application server may include means for marking the Public Service Identity as reserved and pending for activation. In this case, the central entity may further comprise means for receiving a confirmation from the application server indicating that the Public Service Identity is operative, as well as means for marking the Public Service Identity as operative.

On the other hand, in accordance with some embodiment of the invention, there might be several application servers in charge of executing a particular service. In this case, the central entity may be configured so that the means for receiving a Public Service Identity includes means for receiving information about the several application servers also running the corresponding service.

In accordance with another embodiment of the invention, the central entity is such implemented that the means for receiving a Public Service Identity identifying a service includes means for receiving an identifier of the application server executing the service.

The central entity may be enhanced to include means for instructing the assigned Home Subscriber Server to associate a given Public Service Identity identifying a service with an identifier of the application server that executes the service. Moreover, this means for instructing the assigned Home Subscriber Server may further include means for providing a control indicator to instruct the assigned Home Subscriber Server on how to further handle the operation of the Public Service Identity.

In particular, this control indicator may adopt one value selected from: a 'CSCF-controlled' value to be used when the Home Subscriber Server maintains address information of an S-CSCF from where the application server that executes the service identified by the Public Service Identity is addressed; and a 'Self-controlled' value to be used when the Home Subscriber Server maintains address information of the application server that executes the service identified by the Public Service Identity, and the Home Subscriber Server directly provides the identification of said application server.

Furthermore, this means for instructing the assigned Home Subscriber Server may further include means for providing profile information for the Public Service Identity. The profile information may include at least one of two different profile components: 'Initial Filter Criteria' to be sent towards an S-CSCF and including address information of the application server that executes the service identified by the Public Service Identity; and 'Direct-AS' routing information that may include the address of the application server, the priority of the application server when more than one had been indicated, default handling indicators, optional service information, and whatever other information useful for the application server.

In accordance with some embodiments of the invention, the central entity may be implemented in such manner that the means for checking the uniqueness of the received Public Service Identity includes means for distinguishing an individual Public Service Identity given as a 'Distinct PSI' from a range of Public Service Identities given as a 'Wildcard PSI'. In this respect, the Home Subscriber Server assigned to hold an individual Public Service Identity is the Home Subscriber Server assigned to hold a 'Wildcard PSI' range that includes the individual Public Service Identity.

In accordance with one embodiment of the invention, the means for receiving a Public Service Identity at the central entity includes an O&M client for receiving from an O&M system the Public Service Identity along with an identifier of the application server where the corresponding service is executed.

On the other hand, a particularly suitable implementation of the present invention for network operators is where the central entity is further arranged for carrying out a subscription locator function, therefore, having means for answering a routing query for a given Public User Identity with an identifier of a Home Subscriber Server holding the subscription for the corresponding user.

In accordance with other aspect of the present invention, there is provided Home Subscriber Server for holding subscriptions of users of a network, wherein each subscription comprises user-related data necessary for servicing the user in the network and is identified by a Public User Identity. The Home Subscriber Server thus has: means for storing the Public User Identity along with the user-related data for each user subscription; and means for providing user-related data upon request with a given Public User Identity.

In accordance with some embodiments of the invention, the Home Subscriber Server also comprises: means for receiving a given Public Service Identity identifying a service, an identifier of an application server executing the service, and a given instruction to operate on the given Public Service Identity; and means for routing a query with the given Public Service Identity towards the application server executing the service.

The above Home Subscriber Server may further include means for receiving a control indicator instructing on how to further handle the operation of the Public Service Identity. This control indicator may adopt one value selected from: a 'CSCF-controlled' value to be used when the application server, which executes the service identified by the Public Service Identity, is addressed from an S-CSCF for which the Home Subscriber Server maintains address information; and a 'Self-controlled' value to be used when the Home Subscriber Server directly provides an identification of the application server executing the service identified by the Public Service Identity, and the Home Subscriber Server maintains address information of the application server.

In this respect, the Home Subscriber Server may be implemented so that the means for routing the query with the given Public Service Identity towards the application server, may include means for re-directing the query towards the S-CSCF when the control indicator has the 'CSCF-controlled' value.

Aligned with a previous embodiment involving the central entity, the Home Subscriber Server may further include means for receiving profile information for the Public Service Identity.

This profile information may include at least one of two different profile components: 'Initial Filter Criteria' to be sent towards an S-CSCF and including address information of the application server that executes the service identified by the Public Service Identity; and 'Direct-AS' routing information that may include the address of the application server, the priority of the application server when more than one had been indicated, default handling indicators, optional service information, and whatever other information useful for the application server.

In a nowadays preferable embodiment, though not limited thereto, the Home Subscriber Server is arranged so that the given Public Service Identity identifying a service, the identifier of the application server executing the service, and the given instruction to process them may be received from the above central entity, the latter capable or not of carrying out a subscription locator function, or may be received from the application server. In this cases, the Home Subscriber Server may further comprises means for answering to the central entity or to the application server a confirmation indicating when the Public Service Identity is operative.

In accordance with another aspect of the present invention, there is provided an application server for executing a service identified by a Public Service Identity in a network, the service being invoked by one or more users in the network, or by the network itself as a result of applying 'Initial Filter Criteria' to a user registering into the network.

This application server is commonly provided with processing means for executing the service logic and, in accordance with the present invention, further comprises:
  means for sending a Public Service Identity identifying a service, which is executed in the application server, along with an own identifier towards the above central entity; and
  means for receiving from the central entity the Public Service Identity assigned to the service along with an identifier of a Home Subscriber Server assigned to hold the assigned Public Service Identity.

This application server may further include: means for providing towards the assigned Home Subscriber Server the assigned Public Service Identity identifying a service, and an identifier of an application server executing the service; and means for instructing the assigned Home Subscriber Server on how to operate on the given Public Service Identity.

Aligned with previous embodiments involving the central entity and the Home Subscriber Server, this application server may further include means for confirming with the central entity whether the assigned Public Service Identity is operative in, or removed from, the Home Subscriber Server.

Apart from the co-operating entities cited above to achieve the objects of the invention, there is also provided in accordance with another aspect of the invention a method for provisioning Public Service Identities in a network, each Public Service Identity identifying a service running in an application server.

This method comprises the steps of:
  receiving at the above central entity a Public Service Identity identifying a service;
  checking the uniqueness of the received Public Service Identity against existing Public Service Identities and Public User Identities;
  storing at the central entity the Public Service Identity assigned to the service along with an identifier of a Home Subscriber Server assigned to hold the assigned Public Service Identity; and storing at the assigned Home Subscriber Server the Public Service Identity, an identifier of an application server executing the service, and a given instruction to operate on the given Public Service Identity.

Aligned with embodiments involving previous entities, this method may further include a step of instructing the assigned Home Subscriber Server on how to further handle the operation of the Public Service Identity with a control indicator. Therefore, this control indicator may adopt one value as described above that can be selected from: a 'CSCF-controlled' value; and a 'Self-controlled' value; both with the already described purposes.

Also aligned with embodiments involving previous entities, this method may further include a step of receiving at the assigned Home Subscriber Server profile information for the Public Service Identity. This profile information including, as described above, at least one of two different profile components: 'Initial Filter Criteria'; and 'Direct-AS' routing information; both with the already described purposes.

On the other hand, the method may be advantageously implemented where the step of checking the uniqueness of the received Public Service Identity includes a step of distinguishing an individual Public Service Identity given as a 'Distinct PSI' from a range of Public Service Identities given as a 'Wildcard PSI'. In this respect, the Home Subscriber Server assigned by this method to hold the assigned Public Service Identity may preferably be the Home Subscriber Server assigned to hold a 'Wildcard PSI' range that includes the assigned Public Service Identity. Moreover, the step of distinguishing a 'Distinct PSI' from a 'Wildcard PSI' in this method includes a step of assigning a new Public Service Identity different than the received Public Service Identity when the latter already exists within an existing 'Wildcard PSI' range.

BRIEF DESCRIPTION OF DRAWINGS

The features, objects and advantages of the invention will become apparent by reading this description in conjunction with the accompanying drawings, in which:

FIG. 5 is a basic signalling flow describing how a PSI can be dynamically created from an application server, either at a user request or by the application server on its own, in accordance with other embodiment of the invention.

DETAILED DESCRIPTION OF PREFERRED EMBODIMENTS

The following describes some preferred embodiments for providing a mechanism to carry out the creation of a PSI in an operator network. Preferably, the mechanism may include two phases: a first phase for the creation of an identifier to be further used as a PSI uniquely defined in the network, and a second phase for the definition of a corresponding 'PSI user' profile.

In accordance with a first aspect of the present invention, there is provided a central entity (SLF) in the operator network having, at least, a reference to all identifiers against which the uniqueness of a PSI must be checked before being created. This entity may assure, especially where different entities are in charge of the different identifiers, the uniqueness of any particular identifier prior to its acceptance.

An identifier may be thus reserved from its creation during a first phase, and in case that a proposed format might allow more than one PSI, for instance a 'Wildcard PSI', a specific PSI fitting the proposed format is assigned by the central entity (SLF) and further returned to the application server (AS) having issued the request. For the purpose of the present invention a 'Wildcard PSI' may adopt, among other, any of the following formats: Range*; *Range; and Range1*Range2.

Figure 1:
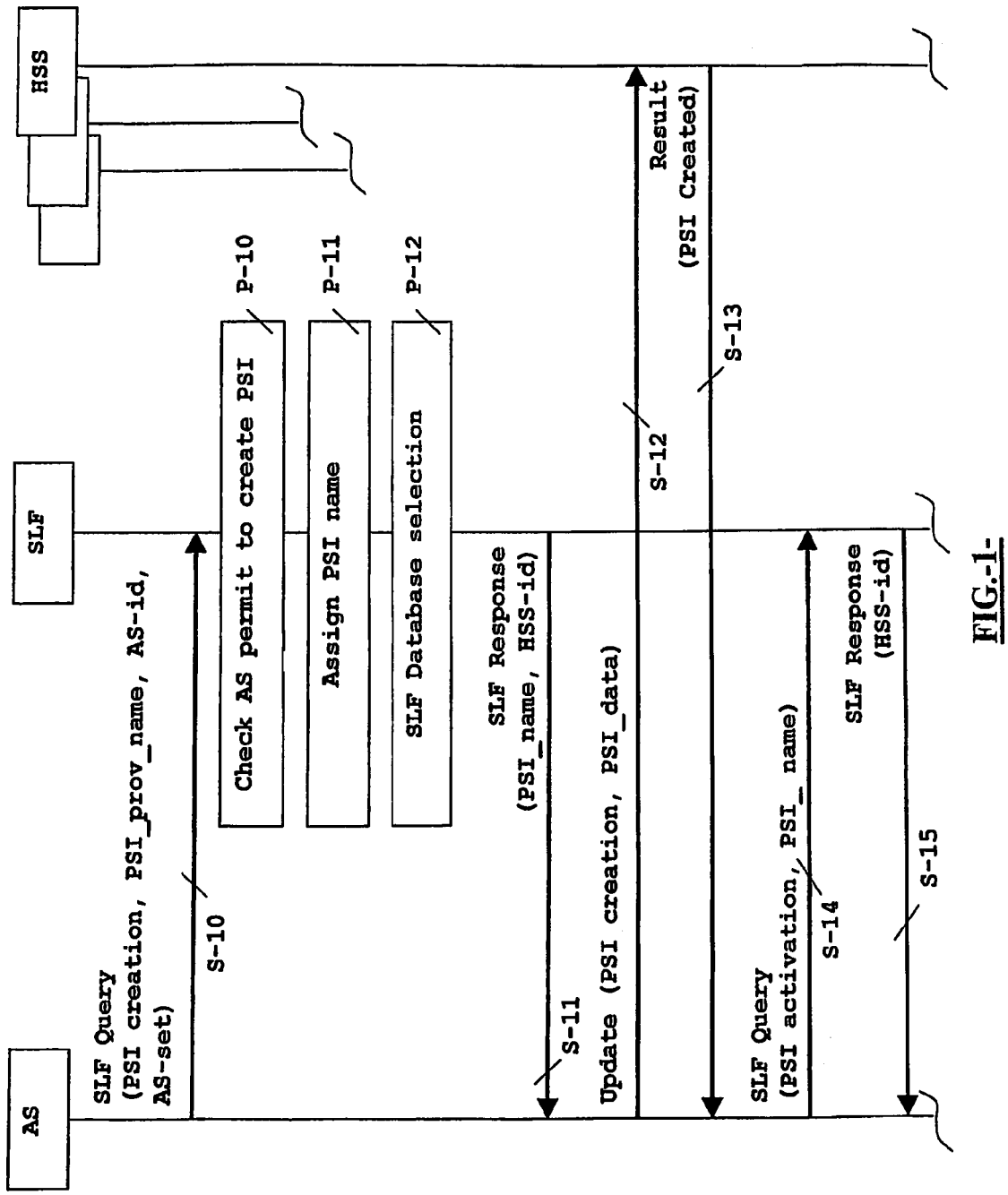
FIG. 1 is a basic signalling flow describing how a PSI can be dynamically created from an application server, either at a user request or by the application server on its own, in accordance with an embodiment of the invention.

Therefore, under a first embodiment shown in FIG. 1, an application server (AS) may request the creation of a PSI, by providing (S-10) an identifier (PSI_prov_name), and likely including a proposed format, towards the central entity (SLF) in the operator network that knows the identifiers already existing in the network. The identifier (PSI_prov_name) may be reserved whilst the central entity performs a so-called uniqueness test against the existing identifiers. Prior to running the uniqueness test, the central entity may check (P-10) whether or not the application server is authorized to create Public Service Identities in the network.

Then, the uniqueness test is performed (P-11) at the central entity (SLF) taking into account different scenarios derived from the different request types issued by the application server (AS), as well as from the different PSI scope and representation, and a valid PSI name (PSI_name) is assigned (P-11) as a result of this test at the central entity (SLF).

For a first exemplary request type, the application server (AS) may have just proposed a name for the PSI (PSI_prov_name), and this proposed name is checked to determine (P-11) its uniqueness. If the proposed name was already known, either defined as a 'Distinct PSI' or matching any 'Wildcard PSI', the central entity (SLF) selects a unique PSI name (PSI_name) on its own, and an HSS to further create a corresponding 'PSI user'. However, in case that the proposed PSI name did not exist in the central entity (SLF), said proposed PSI name (PSI_prov_name) is assigned (P-11) as the PSI name (PSI_name) by the central entity (SLF), and an HSS is selected (P-12) to create a corresponding 'PSI user'.

For a second exemplary request type, the application server (AS) might have proposed as well a name for the PSI (PSI_prov_name) indicating that the PSI to be created belongs to a certain 'Wildcard PSI' range of an already existing 'Wildcard PSI'. In such case, the PSI name to be finally assigned (PSI_name) does not require the selection of a specific HSS since it is covered by the HSS in charge of the already existing 'Wildcard PSI'. Consequently, the central entity (SLF) only has to check in this case whether the PSI belongs to the indicated 'Wildcard PSI' range, or if it also fits to any other 'Wildcard PSI' range, in which case, the central entity (SLF) selects a unique PSI to be assigned (PSI_name) within the indicated 'Wildcard PSI' range. This case may be particularly applicable to a dynamic creation of groups by a user, wherein each PSI exists in the application server (AS), but not in the HSS, since the group is covered by a corresponding 'Wildcard PSI'.

Particularly applicable to both request types in this embodiment, is the case where several application servers handle a same service. Under this assumption, said several application servers share the same 'Wildcard PSI'. Therefore, as FIG. 1 illustrates, an application server (AS) issuing the request (S-10) may also indicate towards the central entity (SLF) those several application servers (AS-set) that share the same 'Wildcard PSI'. This information may be stored in the central entity (SLF) so that, for any further request (S-10), the indicated several application servers (AS-set) may be used to ensure that an application server (AS) requesting a PSI creation has the right to use a given 'Wildcard PSI'.

Thus, for both previous request types illustrated in FIG. 1, and in case that an indication of several application servers (AS-set) was included in the request (S-10), the central entity (SLF) may consider the creation of a PSI into the 'Wildcard PSI' range and a selection (P-12) of an HSS as usual. The central entity (SLF) guarantees the uniqueness of this PSI into the 'Wildcard PSI' range associated to the indicated several application servers (AS-set).

For a third exemplary request type, the application server (AS) may only request the creation a PSI belonging to a given 'Wildcard PSI' range. Then, the central entity (SLF) selects a unique PSI belonging to that range and no HSS is selected since an individual PSI belonging to a 'Wildcard PSI' range is not individually assigned an HSS, but rather the HSS in charge of the whole 'Wildcard PSI' as defined.

For a fourth exemplary request type, the application server (AS) does not propose any name, either a 'Distinct PSI' or a 'Wildcard PSI', and the central entity (SLF) selects on its own a unique PSI and selects (P-12) an HSS to further create a corresponding 'PSI user'.

In short, where a PSI creation is requested (S-10) from an application server (AS) towards the central entity (SLF) with a given 'Distinct PSI' not matching any already defined 'Distinct PSI' and not fitting any already defined 'Wildcard PSI' range, the given 'Distinct PSI' (PSI_name) is assigned (P-11) and reserved for use or activation. On the other hand, where a PSI creation is requested (S-10) with a 'Distinct PSI' that already exists, or with a 'Wildcard PSI', or without any proposed PSI, the central entity (SLF) selects and assigns (P-11) a unique PSI (PSI_name) valid for such request. Nevertheless, the uniqueness of the assigned PSI (PSI_name) is also checked (P-11) against the existing Public User Identities known to the central entity (SLF).

Regarding the selection (P-12) of an HSS to further create a 'PSI user' from the application server (AS), the central entity (SLF) has the knowledge about the number of subscribers that each HSS has in the operator network so that the central entity (SLF) may decide (P-12) a particular HSS where the PSI may be stored or, rather, where a corresponding 'PSI user' may be created. Then, the central entity (SLF) marks the PSI as reserved, and expects a confirmation from the application server (AS) of having created the 'PSI user' at the selected HSS for marking the PSI operative for use. In addition, the central entity (SLF) may maintain a reference to the application server (AS) that has created the PSI in order to secure that a further deletion is performed only by said application server (AS).

As illustrated in FIG. 1, once the created PSI is reserved for use at the central entity (SLF), the central entity (SLF) returns (S-11) to the application server (AS) the assigned PSI (PSI_name), which may be the proposed one from the application server or a new one selected by the central entity (SLF) as explained above, likely with an identifier (HSS-id) of a selected HSS, if applicable, where the corresponding 'PSI user' can be created. It must be noticed that no HSS selection takes place for an individual PSI belonging to an existing 'Wildcard PSI' range, but rather the HSS in charge of the Wildcard PSI' range is assigned.

The application server gets in contact (S-12) with the HSS to create a 'PSI user' therein by providing the necessary PSI data (PSI_data), preferably through the 3GPP-defined 'Sh' or 'Dh' interface with a so-called 'Update' message. As already commented above, necessary PSI data to create a 'PSI user' at the HSS are: an identifier (AS-Id) of the application server running a service, and the Public Service Identity (PSI) identifying the service. This operation may be also used to include PSI-related profile information, and likely a control indicator, which had been cited above as a second phase of the mechanism to carry out the creation of a PSI in an operator network.

Regarding the PSI-related profile information, during the creation of the 'PSI user' in the HSS, the application server (AS) can create two different profile components: a so-called Initial Filter Criteria (generally known as IFC), as defined by the technical specification 3GPP TS 23.008; and a so-called 'Direct-AS' routing information that may include the address of the application server (AS), the priority of the application server when more than one (AS-set) had been indicated, default handling indicators, optional service information, and whatever other information useful for the application server (AS). Moreover, the fact of separating the PSI reservation from the PSI activation allows temporary or periodical activation and deactivation of a PSI, therefore, this PSI-related profile information may be used to include relevant information related to periods for activation or deactivation of a PSI.

On the other hand, the control indicator is used to indicate the HSS how to further handle the operation of a PSI, once created and operative. The control indicator may adopt for each PSI created one of two values: 'CSCF-controlled' and 'Self-controlled'.

Figure 3:
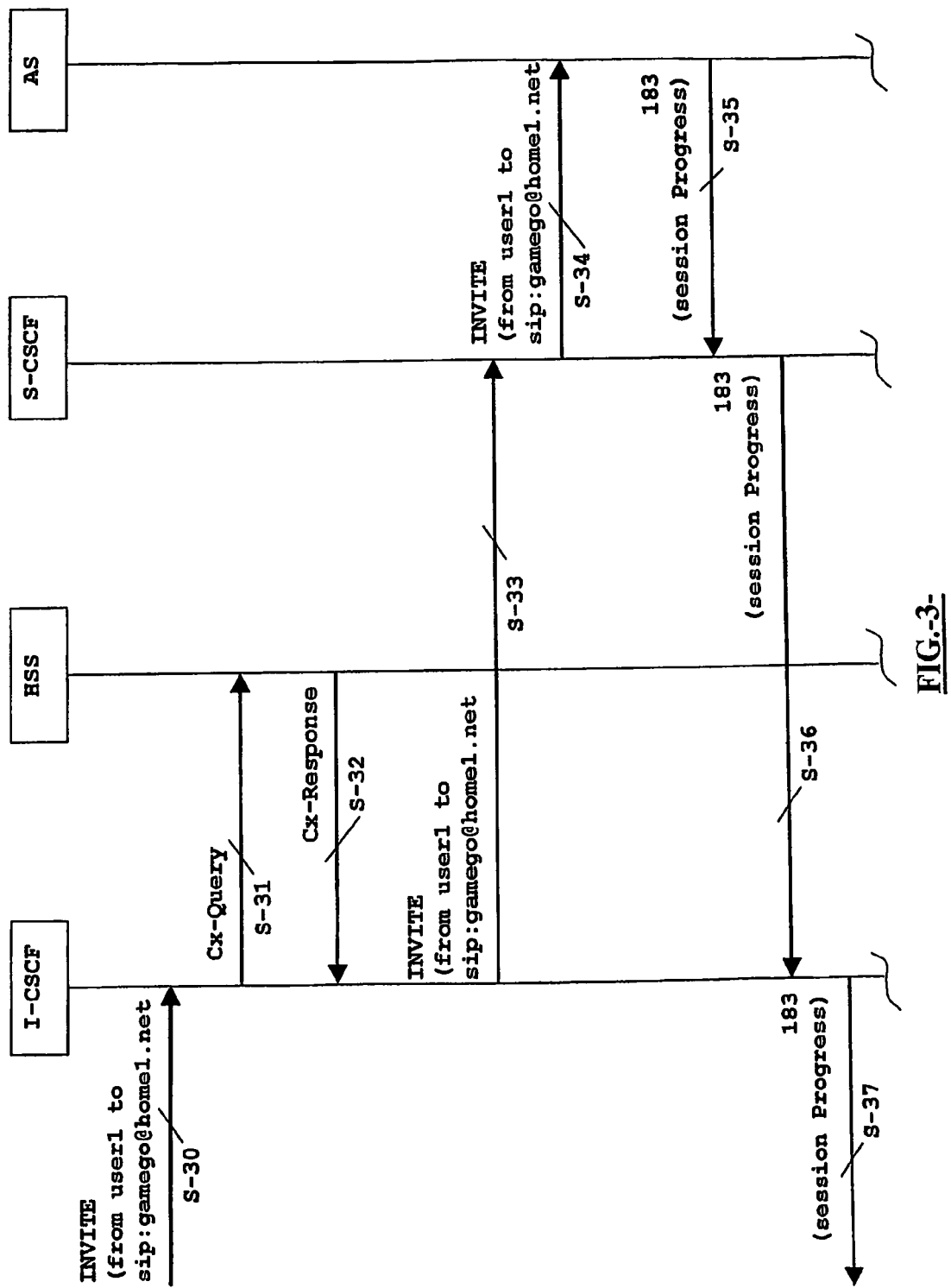
FIG. 3 illustrates a basic signalling flow describing the operation with a PSI to achieve an indirect routing to the application server where the service corresponding to the PSI is running through a Serving Call Session Control Function.

The 'CSCF-controlled' value is used as FIG. 3 shows when the HSS maintains both the assigned S-CSCF information and the so-called Initial Filter Criteria (generally known as IFC) for the 'PSI user', and indicates that the application server (AS) may be addressed following normal procedures specified by 3GPP. In the case of using the 'CSCF-controlled' value, the application server (AS) may request or not a registration procedure to be performed. In case that no registration procedure is needed, the IFC for a non-register status points out to the application server (AS).

Figure 4:
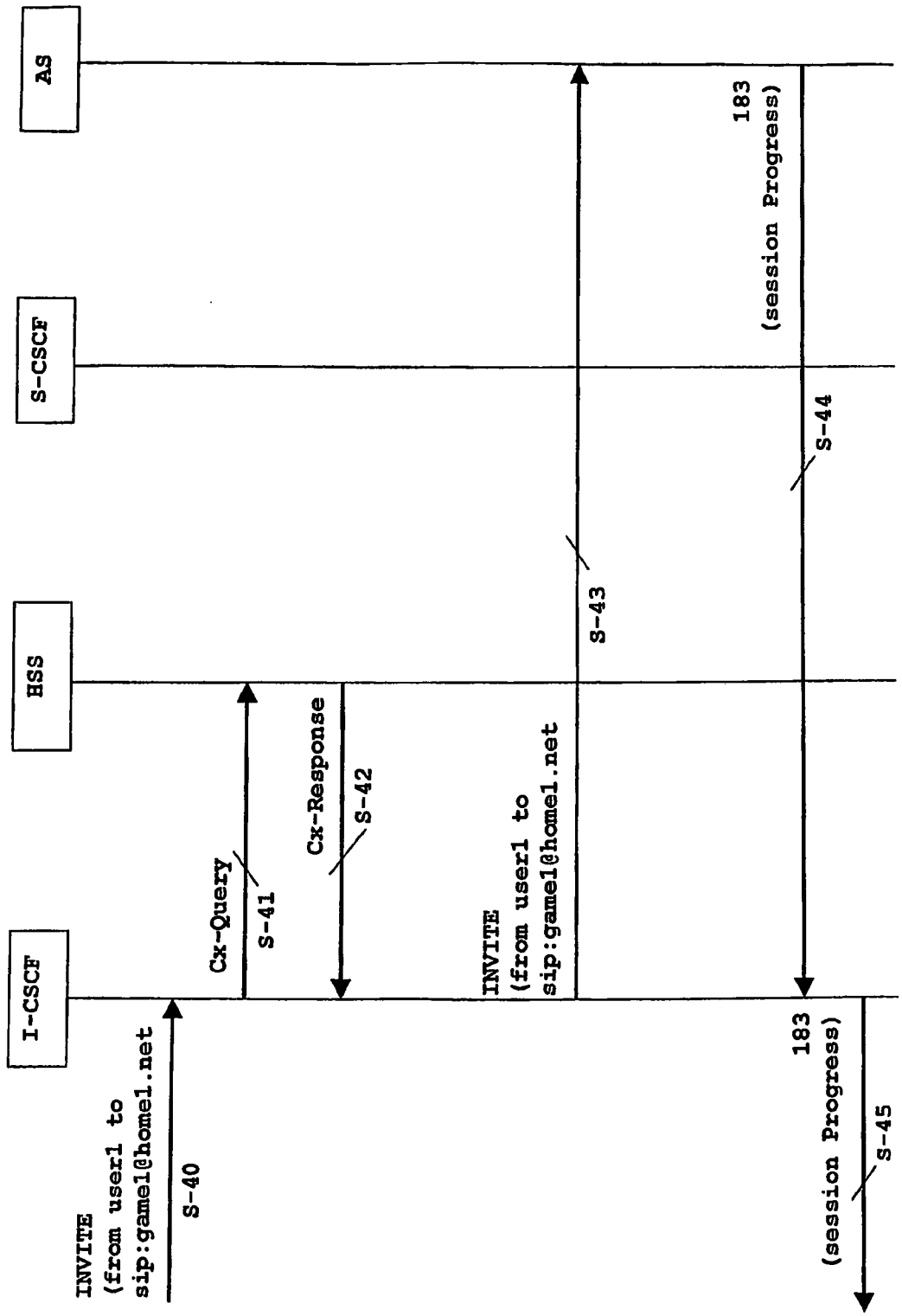
FIG. 4 illustrates a basic signalling flow describing the operation with a PSI to achieve a direct routing to the application server where the service corresponding to the PSI is running.

The 'Self-controlled' value is used as FIG. 4 shows when the HSS maintains the address information of the application server (AS) hosting the PSI for the 'PSI user' to be created. In this case, when a terminating session asks for the S-CSCF serving the 'PSI user' following the IMS routing principles under 3GPP, the HSS provides the identification of the specific application server (AS), and the terminating session progresses directly towards said specific application server (AS).

Eventually, once a corresponding 'PSI user' has been created in the HSS under the first embodiment illustrated in FIG. 1, the result is sent back (S-13) to the application server (AS). Therefore, new result codes may be preferably included in the 3GPP-defined 'Sh' and 'Dh' interfaces.

Now, the application server (AS) may confirm (S-14) towards the central entity (SLF) the PSI creation. This confirmation may include an order to activate the PSI for operation, if just a reservation without activation was previously carried out at the central entity (SLF), or no order at all if the activation was done at the same time of reservation, being this understood as a mere confirmation of having concluded the creation. Preferably, a so-called 'SLF_Query' message of a 3GPP-defined 'Sh' or 'Dh' interface is adapted to this end, that is, in order to include the action that the application server (AS) wants to perform, such as the activation of the new PSI may be. Upon receiving such confirmation (S-14) the central entity (SLF) may mark the PSI as active for operation and the PSI is fully operative for use.

In accordance with a second embodiment of the invention illustrated in FIG. 5, and in order to make the PSI creation as much transparent as possible to the application server (AS), the central entity (SLF) takes control over the request for PSI creation. Therefore, once the application server has been validated (P-10) for PSI creation, the uniqueness test has been performed (P-11) and a unique PSI assigned, and an HSS has been selected (P-12) for further creating a 'PSI user' as in previous embodiment of FIG. 1, and instead of using a redirect functionality whereby the selected HSS is communicated to the application server, the central entity (SLF) forwards (S-52) the PSI creation request towards such selected HSS to create a 'PSI user' therein by providing the necessary PSI data (PSI_data). As for the first embodiment, the necessary PSI data to create a 'PSI user' at the HSS are: an identifier (AS-Id) of the application server running a service, and the Public Service Identity (PSI) identifying the service. Once the request is forwarded (S-52) to the HSS, the central entity (SLF) may mark the Public Service Identity as reserved until a proper confirmation of being operative is received.

Also under the embodiment illustrated in FIG. 5, the above control indicator may be included to instruct the HSS on how to further handle the operation of a PSI, once created and operative. As indicated above for the first embodiment, the control indicator may adopt for each PSI created one of two values: 'CSCF-controlled' and 'Self-controlled'.

Moreover, the PSI-related profile information explained above for the first embodiment may be also submitted for being applied during the creation of the 'PSI user' in the HSS. Therefore, the above two different profile components: Initial Filter Criteria and 'Direct-AS' routing information may be included in the submission to the HSS for the creation of the corresponding 'PSI user'.

Then, once a corresponding 'PSI user' is created in the HSS and all the relevant information is stored therein, the result is sent back (S-53) towards the central entity (SLF). This result may be assumed by the central entity (SLF) as a confirmation that the PSI is operative for use.

Once the PSI is created and operative for use, the central entity (SLF) may return (S-11) to the application server (AS) the assigned PSI (PSI_name), which may be the proposed one from the application server (AS) or a new one selected by the central entity (SLF) as explained above, likely with an identifier (HSS-id) of the selected HSS, as a confirmation that the PSI has been created.

A difference between this second embodiment and the first one is that no activation message (S-14) is needed from the application server (AS) towards the central entity (SLF) since the PSI creation process is under control of said central entity. Moreover, in case any error occurs in the HSS the central entity (SLF) is aware of it and can go to a safer fallback status where the consistency in both central entity (SLF) and HSS is assured without needing to involve the application server but with a negative result for the latter to likely re-attempt again.

Regarding the operation of services with Public User Identities, the 3GPP standards describe two basic modes of invoking a PSI for operation: on the originating side, and on the terminating side.

As invoking a PSI on the originating side by a user, the user issues a service request towards an S-CSCF currently assigned to the user and following currently existing procedures under 3GPP. A PSI, along with addressing information to reach the application server in charge of said PSI, is currently pre-configured as a part of originating filter information, namely the IFC cited above, within the user subscription information that is known to the S-CSCF. Thus, a user-originated service request is directed to the application server hosting the service. Now, thanks to an aspect of the present invention, the PSI likely resulting from a dynamic creation by the application server may be submitted to the S-CSCF together with the subscription information for an originating user. A PSI for use on the originating side may be a 'Distinct PSI' as referred above, or an individual PSI within a 'Wildcard PSI' range; and it is only accessible internally within the operator domain where the PSI has been created.

As illustrated in FIG. 3 and FIG. 4, and likely depending on the value of a control indicator used during the creation of a PSI, when invoking the PSI on the terminating side by a user who wants to use the corresponding service, the user issues a service request with a PSI that is directed (S-30), through other network entities such as a Proxy Call Session Control Function (generally known as 'P-CSCF' under 3GPP) not shown in any drawing, towards an Interrogating Call Session Control Function (generally known as 'I-CSCF' under 3GPP) at the terminating side. The I-CSCF queries (S-31, S-41) the HSS at the terminating side about the 'PSI user', following the conceptual definition given above. Then, likely depending on the control indicator value, the HSS may go on with one of the embodiments shown in FIG. 3 and FIG. 4.

As FIG. 3 illustrates, the I-CSCF is informed (S-32) by the HSS about the S-CSCF currently assigned to said 'PSI user', as if it were a user rather than a service, and in accordance with currently existing IMS principles. The service request is then directed (S-33) to said S-CSCF, which forwards (S-34) the session to an application server (AS) hosting the PSI according to terminating filter criteria. A PSI for use on the terminating side may be a "Distinct PSI" or a 'Wildcard PSI' as referred above.

However, in the embodiment of FIG. 4, the I-CSCF is directly informed (S-42) by the HSS of the application server (AS) hosting the PSI according to terminating filter criteria and the I-CSCF may submit (S-43) the service request to said application server (AS).

In accordance with another aspect of the invention, all the entities involved in the creation of a PSI, namely the application server (AS), the assigned Home Subscriber Server (HSS) and the central entity (SLF), they all participate in the removal of such PSI.

Figure 2:
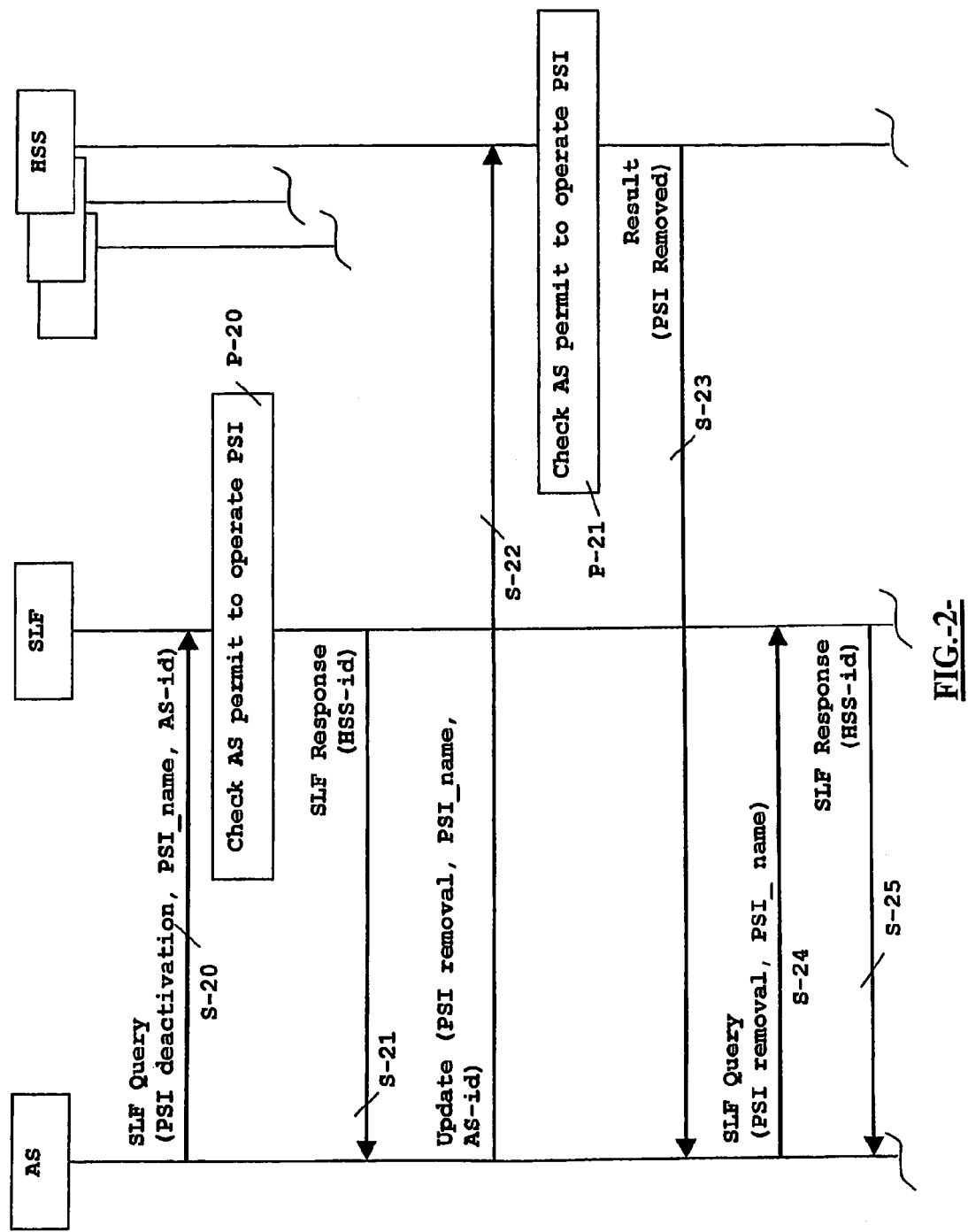
FIG. 2 is a basic signalling flow describing how a PSI can be dynamically deleted from the application server which had previously created it, either at a user request or by the application server on its own, in accordance with an embodiment of the invention.

In this respect, and as FIG. 2 illustrates, both Home Subscriber Server (HSS) and central entity (SLF) may control that the application server (AS) carrying out the deletion of a PSI has the rights to do it.

Therefore, the central entity is given the means for receiving (S-20) a Public Service Identity (PSI_name) to be removed along with a given instruction (PSI removal) to remove the given Public Service Identity (PSI_name) from the network entities. To this end, when the removal of the Public Service Identity is triggered from the application server (AS) in accordance with the embodiment shown in FIG. 2, the so-called 'SLF_Query' message of a 3GPP-defined 'Sh' or 'Dh' interface is preferably modified in order to include the action that the application server (AS) intends to perform, namely the deactivation and removal of the Public Service Identity (PSI).

Under this embodiment, the central entity (SLF) only allows (P-20) the deactivation of a Public Service Identity to those application servers (AS, AS-set) having the right to do it, namely the one (AS) that has created and activated the Public Service Identity, or any other within a group of several application servers (AS-set) also executing the corresponding service.

Then, in an embodiment for removal of a Public Service Identity (PSI) corresponding to the first embodiment for creation of a Public Service Identity (PSI), the central entity (SLF) deactivates the PSI, answers (S-21) to the application server (AS) having triggered the removal, and waits for a confirmation (S-24) of removal from said application server (AS). The answer (S-21) from the central entity to the application server (AS) may also include the identifier (HSS-id) of the Home Subscriber Server (HSS) handling the corresponding 'PSI user' to avoid that the application server (AS) maintains such a reference.

Upon receipt of such answer at the application server (AS), the Home Subscriber Server (HSS-id) is contacted (S-22) to remove the PSI. Therefore, the 3GPP-defined 'Sh' or 'Dh' interface, or both, is preferably extended to allow the creation and removal of Public Service Identities with the so-called 'Update' message. In particular, when a 'Wildcard PSI' had been associated to a group of several application servers (AS-set) and the 'Wildcard PSI' has to be deleted, the instructions sent (S-20, S-22) from the application server (AS) towards the central entity (SLF) and the Home Subscriber Server (HSS-id) respectively include an identifier of the 'Wildcard PSI' (PSI_name) and an identifier of the group of several application servers (AS-set).

Upon receipt of an order (PSI removal) to remove an existing 'PSI user', the Home Subscriber Server (HSS-id) checks (P-21) that the ordering application server (AS) is the one that only has the right to do it, carries out the requested order, and answers (S-23) back to the application server (AS) with the result of the removal request. In this respect, new result codes may be included in the 3GPP-defined 'Sh' and 'Dh' interfaces.

Once the answer (S-23) from the Home Subscriber Server (HSS-id) is received at the application server (AS) indicating the removal of the 'PSI user', the confirmation expected is sent (S-24) to the central entity (SLF) to definitely remove all references to the corresponding Public Service identity (PSI-_name) and a corresponding acknowledge returned (S-25) to the application server indicating the end of the removal. In particular, the central entity (SLF) may as well include policies to avoid the use of such Public Service Identity for any purpose during a certain time.

Apart from the invention being applicable to dynamic creation of Public Service Identities, the invention is also applicable to a static creation of Public Service Identities, and the means and method required for both mechanisms, under the embodiments provided in accordance with the invention, harmonise within a single inventive concept for carrying out the objects of the invention.

More specifically, the static creation of a Public Service Identity may be triggered from an O&M system towards the central entity (SLF). To this end, and in accordance with an embodiment of the invention not shown in any drawing, the central entity includes an O&M client for receiving (S-10, S-20) from an O&M system the Public Service Identity (PSI_prov_name, PSI_name) along with an identifier (AS-id, AS-set) of the application server (AS) where the corresponding service is executed. Moreover, an identifier of a Home Subscriber Server (HSS-id) to be assigned might also be assigned when the overall creation of a Public Service Identity is handled by an O&M system.

Other embodiments are also possible in light of the above teaching for performing all the interactions between an application server (AS) and a Home Subscriber Server (HSS) through a central entity (SLF), or even including a mediation device between the application server and the central entity and between the application server and the Home Subscriber Server. Moreover, the central entity might behave as a subscription locator function, or include its functionality, or might as well be a simple entity including all the Public User identities and Public Service Identities existing in the operator network so that the so-called uniqueness test can be advantageously carried out in a single entity.

In this respect, a subscription locator function is generally understood as a central node in an operator network, is in charge of all Public User Identities for users with a subscription in the network, and is arranged for answering a routing query for a given Public User Identity with an identifier of a Home Subscriber Server (HSS-id) holding the subscription for the corresponding user.

Still further, the solution described hereinbefore is also applicable in case that the Public Service Identity is defined in an external domain, namely outside the scope of operator premises, by the application of specific inter-operator interfaces for a Public Service Identity reservation procedure.

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A central entity for handling Public Service Identities in a network, each Public Service Identity identifying a service running in an application server, the central entity comprising:
   at least one microprocessor; and
   a non-transitory computer-readable storage medium, coupled to the at least one microprocessor, further including computer-readable instructions, when executed by the at least one microprocessor, are configured for:
      storing Public User Identities for users with a subscription in the network;
      receiving a proposed Public Service Identity identifying a service;
      checking the uniqueness of the received Public Service Identity against existing Public Service Identities and Public User Identities;
      storing a unique Public Service Identity assigned to the service along with an identifier of a Home Subscriber Server assigned to hold the assigned Public Service Identity; and
      providing the identifier of the assigned Home Subscriber Server upon a query based on the assigned Public Service Identity.

2. The central entity of claim 1, wherein the Public Service Identity is received from an application server in charge of executing the corresponding service, and the computer-readable instruction are further configured for:
   answering to the application server the Public Service Identity assigned to the service along with an identifier of the assigned Home Subscriber Server.

3. The central entity of claim 2, wherein the computer-readable instructions configured for storing the unique Public Service Identity with an identifier of a Home Subscriber Server are further configured for:
  selecting the Home Subscriber Server from a plurality of Home Subscriber Servers known to the central entity.

4. The central entity of claim 1, wherein the computer-readable instructions configured for checking the uniqueness of the received Public Service Identity are further configured for assigning a unique Public Service Identity different from the one received in case of matching existing Public Service Identities or Public User Identities.

5. The central entity of claim 2, wherein the computer-readable instructions configured for answering to the application server are further configured for marking the Public Service Identity as reserved and pending for activation.

6. The central entity of claim 5, wherein the computer-readable instructions are further configured for receiving a confirmation from the application server that the Public Service Identity is operative; and means for marking the Public Service Identity as operative.

7. The central entity of claim 1, wherein the computer-readable instructions configured for receiving a Public Service Identity are further configured for receiving information about several application servers also running the corresponding service.

8. The central entity of claim 1, wherein the computer-readable instructions configured for receiving a Public Service Identity identifying a service are further configured for receiving an identifier of the application server executing the service.

9. The central entity of claim 8, wherein the computer-readable instructions are further configured for instructing the assigned Home Subscriber Server to associate a given Public Service Identity identifying a service with an identifier of the application server executing the service.

10. The central entity of claim 9, wherein computer-readable instruction configured for instructing the assigned Home Subscriber Server are further configured for providing a control indicator to instruct the assigned Home Subscriber Server on how to handle the operation of the Public Service Identity.

11. The central entity of claim 10, wherein the control indicator adopts one value selected from:
  a 'CSCF-controlled' value to be used when the Home Subscriber Server maintains address information of an S-CSCF from where the application server executing the service identified by the Public Service Identity is addressed; and
  a 'Self-controlled' value to be used when the Home Subscriber Server maintains address information of the application server executing the service identified by the Public Service Identity, and the Home Subscriber Server directly provides the identification of the application server.

12. The central entity of claim 9, wherein the computer-readable instructions configured for instructing the assigned Home Subscriber Server are further configured for providing profile information for the Public Service Identity, the profile information including at least one of two different profile components:
  Initial Filter Criteria to be sent towards an S-CSCF and including address information of the application server that executes the service identified by the Public Service Identity; and
  'Direct-AS' routing information that may include the address of the application server, the priority of the application server when more than one address had been indicated, default handling indicators, optional service information, and whatever other information useful for the application server.

13. The central entity of claim 1, wherein the computer-readable instructions configured for checking the uniqueness of the received Public Service Identity are further configured for distinguishing an individual Public Service Identity given as a 'Distinct PSI' from a range of Public Service Identities given as a 'Wildcard PSI'.

14. The central entity of claim 13, wherein the Home Subscriber Server assigned to hold an individual Public Service Identity is the Home Subscriber Server assigned to hold a 'Wildcard PSI' range that includes the individual Public Service Identity.

15. The central entity of claim 1, wherein the computer-readable instructions configured for receiving a Public Service Identity are further configured for receiving from an O&M system the Public Service Identity along with an identifier of the application server where the corresponding service is executed.

16. The central entity of claim 1, wherein the computer-readable instructions are further configured for:
  carrying out a subscription locator function; and
  answering a routing query for a given Public User Identity with an identifier of a Home Subscriber Server holding the subscription for the corresponding user.

17. A method of provisioning Public Service Identities in a network, each Public Service Identity identifying a service running in an application server, the method comprising the steps of:
  receiving at a central entity a proposed Public Service Identity identifying a service;
  checking the uniqueness of the received Public Service Identity against existing Public Service Identities and Public User Identities;
  storing at the central entity a valid unique Public Service Identity assigned to the service along with an identifier of a Home Subscriber Server assigned to hold the assigned Public Service Identity; and
  storing at the assigned Home Subscriber Server the Public Service Identity, the identifier of the application server executing the service, and the given instruction to operate on the given Public Service Identity.

18. The method of claim 17, further comprising a step of instructing the assigned Home Subscriber Server on how to further handle the operation of the Public Service Identity with a control indicator adopting one value selected from:
  a 'CSCF-controlled' value to be used when the application server, which executes the service identified by the Public Service Identity, is addressed from an S-CSCF for which the Home Subscriber Server maintains address information; and
  a 'Self-controlled' value to be used when the Home Subscriber Server directly provides the identification of the application server executing the service identified by the Public Service Identity, and the Home Subscriber Server maintains address information of the application server.

19. The method of claim 17, further including a step of receiving, at the assigned Home Subscriber Server, profile information for the Public Service Identity of at least one of two different profile components, comprising:
  Initial Filter Criteria to be sent towards an S-CSCF and including address information of the application server that executes the service identified by the Public Service Identity; and
  'Direct-AS' routing information that may include the address of the application server, the priority of the application server when more than one had been indicated, default handling indicators, optional service information, and whatever other information useful for the application server.

20. The method of claim 17, wherein the step of checking the uniqueness of the received Public Service Identity includes a step of distinguishing an individual Public Service Identity given as a 'Distinct PSI' from a range of Public Service Identities given as a 'Wildcard PSI'.

21. The method of claim 20, wherein the Home Subscriber Server assigned to hold a 'Wildcard PSI' range that includes the assigned Public Service Identity is assigned to hold the assigned Public Service Identity.

22. The method of claim 20, wherein the step of distinguishing a 'Distinct PSI' from a 'Wildcard PSI' includes a step of assigning a new unique Public Service Identity different than the received proposed Public Service Identity when the latter already exists within an existing 'Wildcard PSI' range.

\* \* \* \* \*